US010337395B2

(12) United States Patent
Crusius et al.

(10) Patent No.: US 10,337,395 B2
(45) Date of Patent: Jul. 2, 2019

(54) SYSTEM AND METHOD FOR OPERATING A PRESSURE-RELIEVING FLUID-METERING VALVE ASSEMBLY

(71) Applicant: ILLINOIS TOOL WORKS INC., Glenview, IL (US)

(72) Inventors: Steven C. Crusius, Gurnee, IL (US); David Lickenbrock, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/314,166

(22) PCT Filed: Jun. 1, 2015

(86) PCT No.: PCT/US2015/033576
§ 371 (c)(1),
(2) Date: Nov. 28, 2016

(87) PCT Pub. No.: WO2015/187579
PCT Pub. Date: Dec. 10, 2015

(65) Prior Publication Data
US 2017/0101921 A1    Apr. 13, 2017

Related U.S. Application Data

(60) Provisional application No. 62/006,980, filed on Jun. 3, 2014.

(51) Int. Cl.
*F01P 7/14*     (2006.01)
*F01P 7/16*     (2006.01)
(Continued)

(52) U.S. Cl.
CPC ............... *F01P 11/18* (2013.01); *F01P 7/165* (2013.01); *F16K 5/0407* (2013.01);
(Continued)

(58) Field of Classification Search
CPC ...... F01P 11/18; F01P 7/165; F01P 2007/146; F16K 5/0605; F16K 5/0407; F16K 11/076; F16K 11/087
See application file for complete search history.

(56) References Cited

U.S. PATENT DOCUMENTS 4,403,626 A * 9/1983 Paul, Jr. .............. F16K 11/0873
137/118.07
5,617,815 A    4/1997 Spies et al.
(Continued)

FOREIGN PATENT DOCUMENTS

DE    3322068 A1    12/1984
EP    0066023 A1    12/1982
(Continued)

OTHER PUBLICATIONS

ISR and WO for PCT/US2015/033576 dated Aug. 21, 2015.

*Primary Examiner* — Jacob M Amick
*Assistant Examiner* — Charles Brauch
(74) *Attorney, Agent, or Firm* — Quarles & Brady LLP

(57) ABSTRACT

A fluid control system may include a fluid conduit defining a fluid passage, and a fluid metering assembly in fluid communication with the fluid passage. The fluid metering assembly may include a metering valve rotatably secured within an internal chamber. An actuator may be coupled to the metering valve. A control unit may be coupled to the actuator. The control unit is configured to operate the actuator to rotate the metering valve between an open position in which fluid flows through the fluid passage and a closed position in which the fluid is prevented from flowing through the fluid passage. The control unit is configured to operate the actuator to rotate the metering valve into a pressure relief position beyond the closed position that is configured to allow a reduced portion of the fluid to flow through the fluid passage.

20 Claims, 8 Drawing Sheets

(51) Int. Cl.
*F16K 5/04* (2006.01)
*F16K 5/06* (2006.01)
*F01P 11/18* (2006.01)
*F16K 11/076* (2006.01)
*F16K 11/087* (2006.01)

(52) U.S. Cl.
CPC .......... *F16K 5/0605* (2013.01); *F16K 11/076* (2013.01); *F16K 11/087* (2013.01); *F01P 2007/146* (2013.01)

(56) References Cited

U.S. PATENT DOCUMENTS

| | | |
|---|---|---|
| 6,539,899 B1 | 4/2003 | Piccirilli et al. |
| 2004/0154671 A1 | 8/2004 | Martins et al. |
| 2006/0070672 A1* | 4/2006 | Martins .............. B60H 1/00485 137/625.47 |
| 2011/0247575 A1 | 10/2011 | Heldberg |

FOREIGN PATENT DOCUMENTS

| | | |
|---|---|---|
| WO | 03006858 A1 | 1/2003 |
| WO | 2010061343 A1 | 6/2010 |

\* cited by examiner

SYSTEM AND METHOD FOR OPERATING A PRESSURE-RELIEVING FLUID-METERING VALVE ASSEMBLY

RELATED APPLICATIONS

This application is a National Phase of International Application No. PCT/US2015/033576, filed Jun. 1, 2015, and relates to and claims priority benefits from U.S. Provisional Patent Application No. 62/006,980, filed Jun. 3, 2014, which is hereby incorporated by reference in its entirety.

FIELD OF EMBODIMENTS OF THE DISCLOSURE

Embodiments of the present disclosure generally relate to cooling systems configured for use with engines (such as internal combustion engines, electrical engines, and/or the like), and, more particularly, to systems and methods for operating a pressure-relieving fluid-metering assembly of a cooling system.

BACKGROUND

A typical internal combustion engine includes a main cooling circuit configured to allow coolant, such as water, to flow through a radiator. A bypass conduit opens during a start phase of the engine and allows the coolant to circulate through the bypass conduit. In general, a thermostatic valve system controls the flow of coolant. At least one valve is driven by a thermally expansive member and fit with a bypass valve. The valves are connected to each other such that, at a predefined lower temperature, the thermostatic valve is closed and the bypass valve is open. As the temperature increases, the thermostatic valve opens, and the bypass valve gradually closes. WO2010/061343, entitled "A Cooling System For A Combustion Engine," which is hereby incorporated by reference in its entirety, provides further details of a cooling system.

A typical ball valve thermostat assembly includes a fail-safe return member and utilizes a control unit that is configured to drive the valve in both open and closed directions. However, the valve is generally only electrically driven in the closed direction. During a cold start, the valve is driven to the closed position so that the engine may be quickly heated. When temperatures are extremely cold, the motion of the fail-safe return member is generally slower than at normal operating temperatures. If the engine is revved when the outside temperature is extremely cold, and the valve is in the closed position, high pressures may develop within the cooling system. The resulting high pressures may damage the cooling system and the engine.

FIG. 1 illustrates a graph of typical valve operation within a coolant regulator. As shown, angular valve positions of 0 degrees and 93 degrees provide hard physical stops within the coolant regulator. Angular valve positions of 5 degrees and 88 degrees provide soft stops. To close the valve, the valve is electrically actuated to a rotated position of 88 degrees. To re-open the valve, the electrical signal is stopped and the return spring opens the valve. The valve can be stopped at any angle by applying sufficient electrical energy to stop the valve without moving it back toward the open (or closed) position.

However, as pressure increases within the coolant regulator, the closed position of the valve generally prevents fluid from passing therethrough. As such, fluid pressure within the coolant regulator may build and damage the coolant regulator and/or the engine. Accordingly, a need exists for a system and method of relieving pressure within a coolant regulator.

SUMMARY OF EMBODIMENTS OF THE DISCLOSURE

Certain embodiments of the present disclosure provide a fluid control system that may include a fluid conduit defining a fluid passage, and a fluid metering assembly in fluid communication with the fluid passage. The fluid metering assembly may include a metering valve rotatably secured within an internal chamber. An actuator may be coupled to the metering valve. A control unit may be coupled to the actuator. The control unit is configured to operate the actuator to rotate the metering valve between an open position in which fluid flows through the fluid passage and a closed position in which the fluid is prevented from flowing through the fluid passage. The control unit is configured to operate the actuator to rotate the metering valve into a pressure relief position beyond the closed position that is configured to allow a reduced portion of the fluid to flow through the fluid passage.

The fluid control system may include a coolant regulator assembly that may include a main body that retains at least a portion of the actuator, and the fluid metering assembly. The coolant regulator assembly may be configured to be disposed within an internal combustion engine cooling system.

The metering valve may include a semispherical blocking wall. A fluid opening may be formed through a portion of the blocking wall. The fluid opening aligns with the fluid passage in the open position. The blocking wall may extend from a leading end to a trailing end. The pressure relief position may be rotatably past the closed position and opposite from a direction towards the open position. The trailing end may include an over-travel section that is sized and shaped to provide a pressure relief fluid path when the metering valve is in the pressure relief position. The trailing end may include a recessed portion that is configured to allow a portion of the fluid to pass thereby when the metering valve is in the pressure relief position. In at least one embodiment, the open position is at 0 radial degrees, the closed position is in the range of 90 and 100 radial degrees, and the pressure relief position is between the closed position and up to and including 120 radial degrees. In at least one embodiment, the rotational angle positions may be calibrated with respect to the open position, such that the open position is considered to be at 0 radial degrees.

Certain embodiments of the present disclosure provide a fluid metering assembly configured to be in fluid communication with a fluid passage of a fluid conduit. The fluid metering assembly may include a metering valve rotatably secured within an internal chamber. The metering valve is configured to be rotated between an open position in which fluid flows through the fluid passage and a closed position in which the fluid is prevented from flowing through the fluid passage. The metering valve is configured to be rotated into a pressure relief position beyond the closed position that is configured to allow a reduced portion of the fluid to flow through the fluid passage.

Certain embodiments of the present disclosure provide an engine cooling system that may include an engine (such as an internal combustion engine or an electric engine), a cooling circuit including a radiator and a fluid conduit defining a fluid passage, and a coolant regulator assembly in fluid communication with the cooling circuit. The coolant regulator assembly may include a fluid metering assembly in fluid communication with the fluid passage. The fluid metering assembly may include a metering valve rotatably secured within an internal chamber, and a main body coupled to the fluid metering assembly. The main body may retain at least a portion of an actuator that is coupled to the fluid metering assembly. The engine cooling system may also include a control unit coupled to the actuator. The control unit is configured to operate the actuator to rotate the metering valve between an open position in which fluid flows through the fluid passage and a closed position in which the fluid is prevented from flowing through the fluid passage. The control unit is configured to operate the actuator to rotate the metering valve into a pressure relief position beyond the closed position that is configured to allow a reduced portion of the fluid to flow through the fluid passage.

Figure 1:
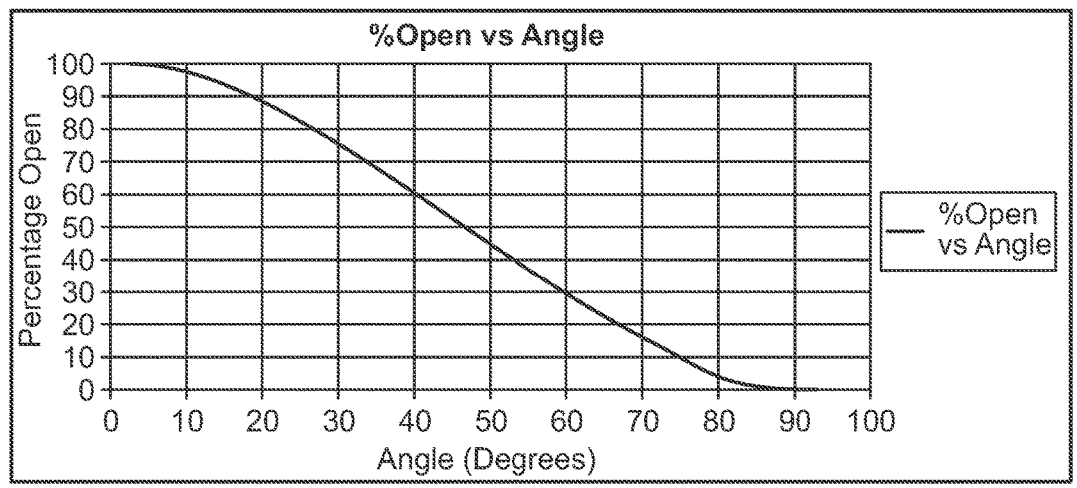
FIG. 1 illustrates a graph of typical valve operation within a coolant regulator.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a coolant regulator assembly that is configured to provide fast-acting pressure relief. Embodiments of the present disclosure provide a coolant regulator assembly that may include a ball valve having an over-travel section that may be actuated to provide a pressure relief path during a cold start, thereby providing fast acting pressure relief. The over-travel section may also be configured to allow the valve to be positioned at a known and/or predetermined position if a return spring fails.

Figure 2:
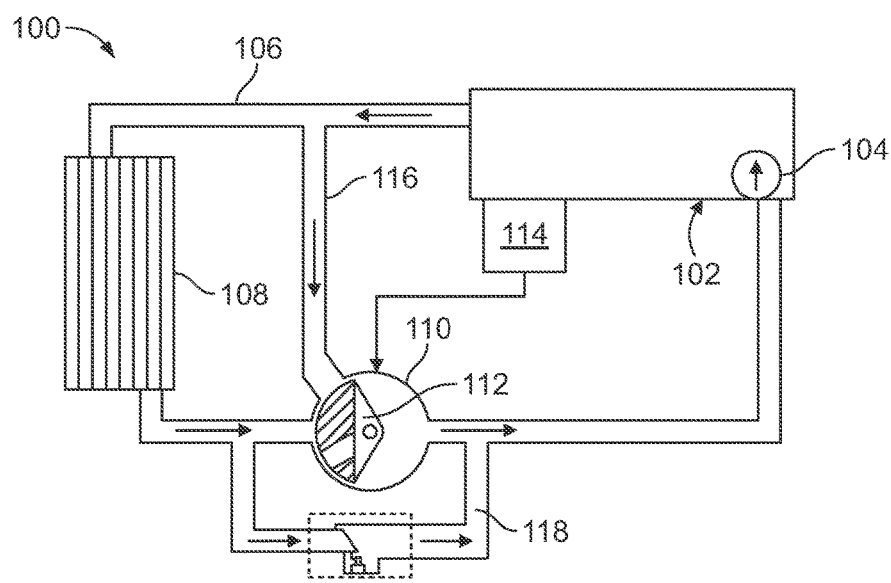
FIG. 2 illustrates a schematic diagram of an internal combustion engine cooling system, according to an embodiment of the present disclosure.

FIG. 2 illustrates a schematic diagram of an internal combustion engine cooling system 100, according to an embodiment of the present disclosure. The engine cooling system 100 may include an internal combustion engine 102 that may be operatively connected to a coolant pump 104, such as a water pump. A cooling circuit 106 may include a radiator 108, which may be in fluid communication with a coolant regulator assembly 110. The coolant regulator assembly 110 may include a fluid-metering assembly 112 that may include a rotatable valve (such as a valve). The valve may be rotatably secured within a flow-regulating chamber of the fluid-metering assembly 112, and may be actuated by an actuator, such as a worm drive or the like. An engine control 114 may operatively control the actuator. The engine control 114 may be configured to detect particular engine states, temperatures within the system, and the like. The cooling circuit 106 may include a shunting bypass 116, which may also be in fluid communication with the coolant regulator assembly 110.

During operation, fluid (for example, coolant) initially circulates by way of the coolant regulator assembly 110 through the bypass 116 so that the internal combustion engine 100 reaches operational temperature as soon as possible. The bypass 116 is blocked only after the coolant reaches a predefined temperature.

The coolant regulator assembly 110 may be configured to completely interrupt the flow of coolant. The interruption may be carried out in a cold start phase so that the internal combustion engine 100 may be heated relatively quickly. If, however, the cold start phase does not take place, the internal combustion engine 100 may overheat. To avoid overheating, a subsidiary branch 118 may be configured to shunt coolant away from the coolant regulator assembly 110.

The fluid-metering assembly 112 within the coolant regulator assembly 110 may include a ball or spherically-shaped main body that is actuated by a direct current motor, for example. The main body may include one or more channels or openings that are configured to be rotated into and out of alignment with conduits, in order to selectively prevent and allow fluid to flow therethrough. As such, the main body is configured to selectively open and close various flow paths at certain angles of rotation.

During operation of the internal combustion engine 100, the flow path of the radiator 108 may be opened to allow for cold coolant to flow from the radiator 108 into the hot coolant flow path. As such, the hot and cold coolant mix, thereby allowing the temperature of the system to be controlled.

Alternatively, embodiments of the present disclosure may be used in conjunction with various other types of engines, such as electric engines.

Figure 3:
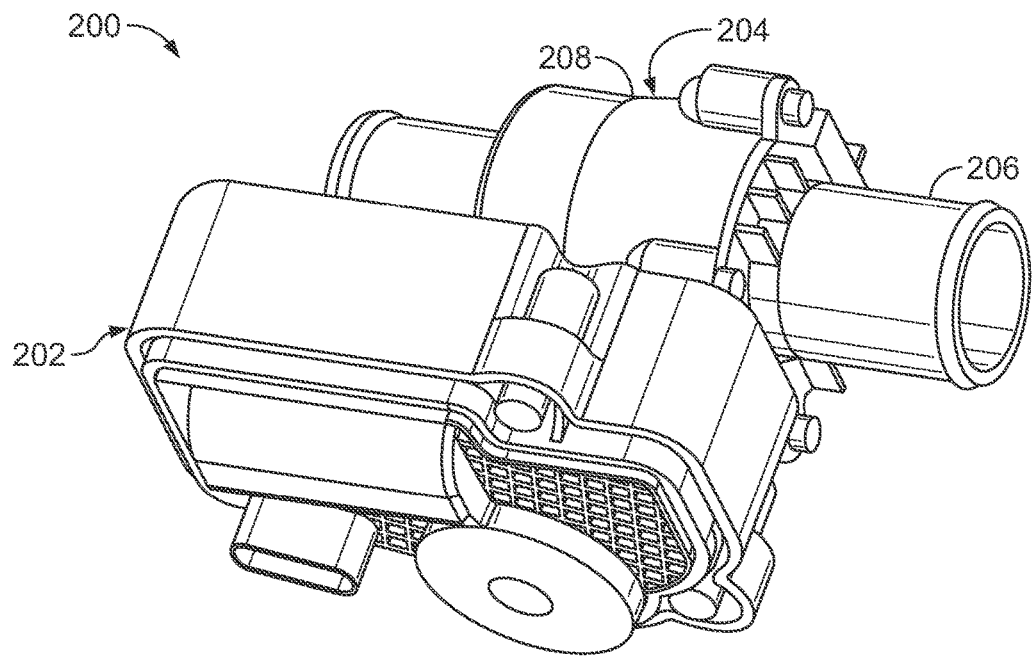
FIG. 3 illustrates a perspective top view of a first side of a coolant regulator assembly, according to an embodiment of the present disclosure.
Figure 4:
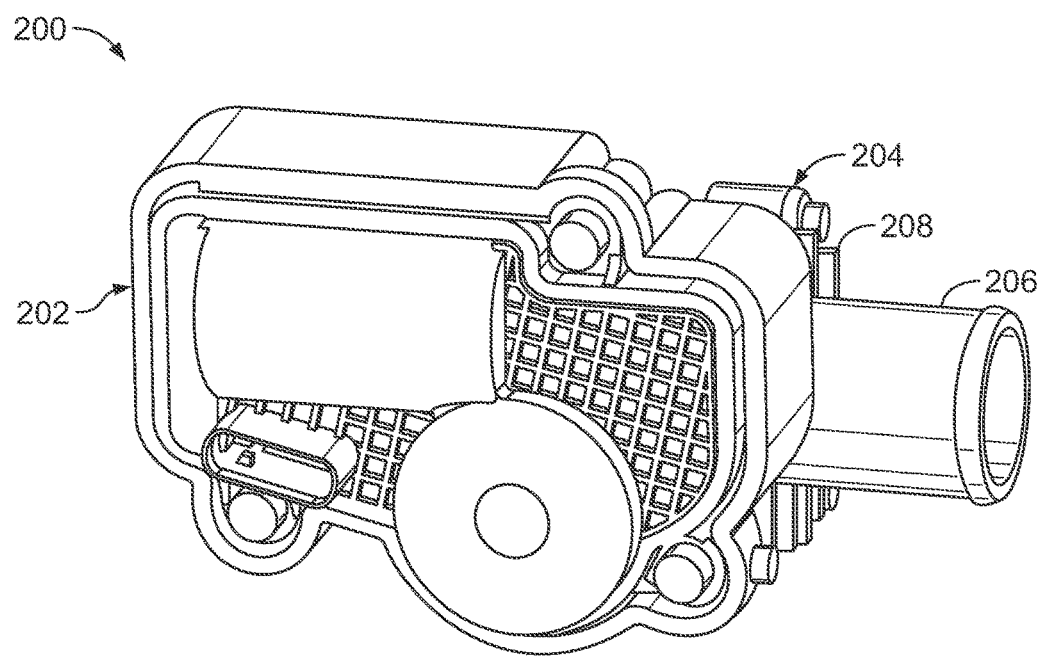
FIG. 4 illustrates a perspective lateral view of a first side of a coolant regulator assembly, according to an embodiment of the present disclosure.
Figure 5:
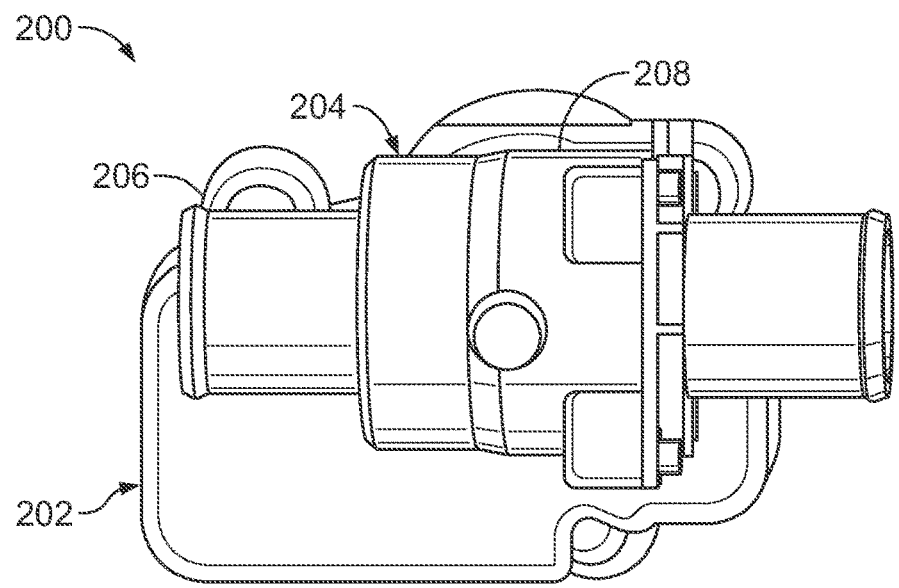
FIG. 5 illustrates a lateral view of a second side of a coolant regulator assembly, according to an embodiment of the present disclosure.
Figure 6:
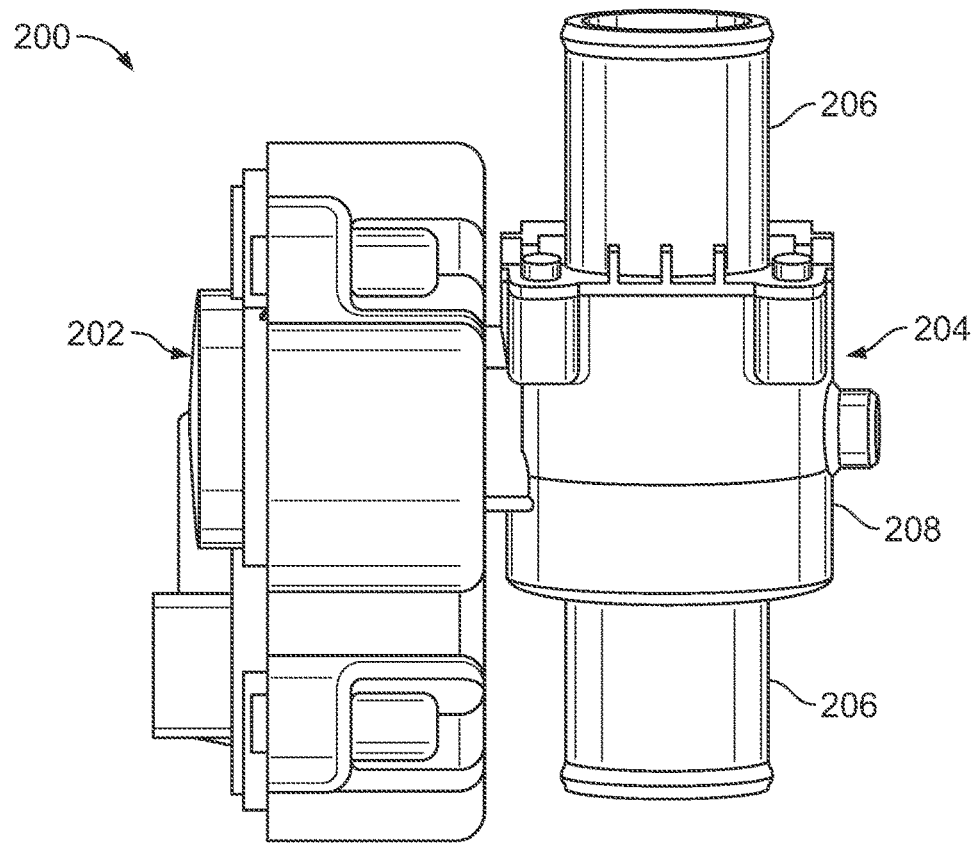
FIG. 6 illustrates a bottom view of a coolant regulator assembly, according to an embodiment of the present disclosure.
Figure 7:
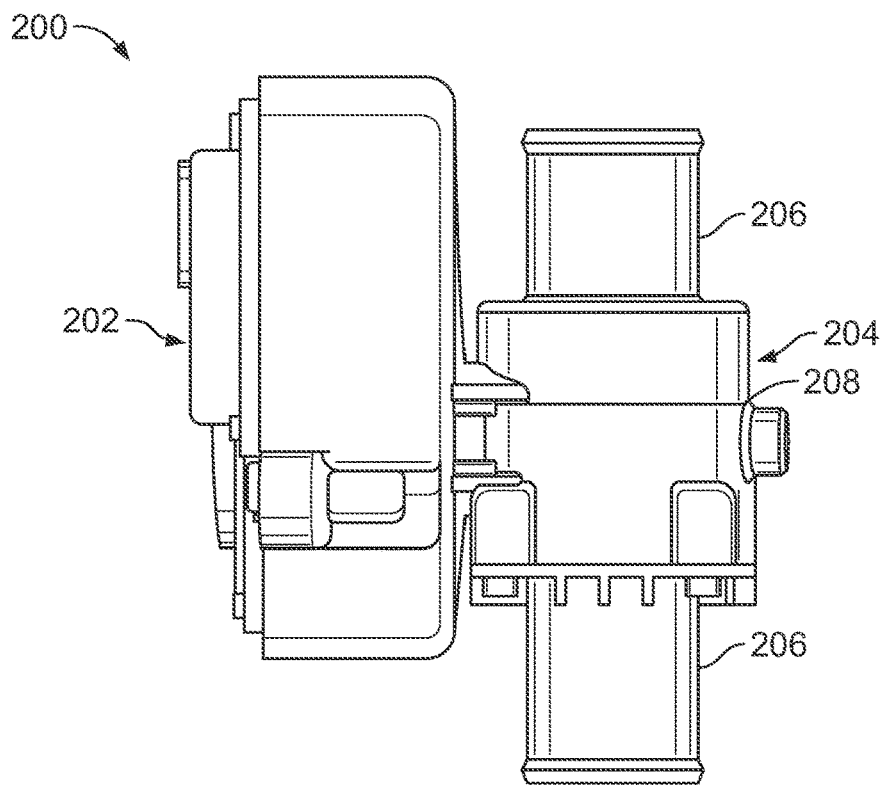
FIG. 7 illustrates a top view of a coolant regulator assembly, according to an embodiment of the present disclosure.

FIG. 3 illustrates a perspective top view of a first side of a coolant regulator assembly 200, according to an embodiment of the present disclosure. FIG. 4 illustrates a perspective lateral view of a first side of the coolant regulator assembly 200. FIG. 5 illustrates a lateral view of a second side of the coolant regulator assembly 200. FIG. 6 illustrates a bottom view of the coolant regulator assembly 200. FIG. 7 illustrates a top view of the coolant regulator assembly 200. Referring to FIGS. 3-7, the coolant regulator assembly 200 is an example of the coolant regulator assembly 110, which is shown in FIG. 1. The coolant regulator assembly 200 may include a main body 202 coupled to a fluid metering assembly 204 disposed within a fluid conduit 206.

The main body 202 may include an actuator, such as a worm drive or other such drive, which is operatively coupled to a metering valve within the fluid metering assembly 204. The actuator may also be operatively coupled to an engine control, such as the engine control 114 (shown in FIG. 2).

The fluid metering assembly 204 may include a housing 208 disposed within the fluid conduit 206. The housing 208 defines an internal flow-regulating chamber that rotatably retains a metering valve.

Figure 8:
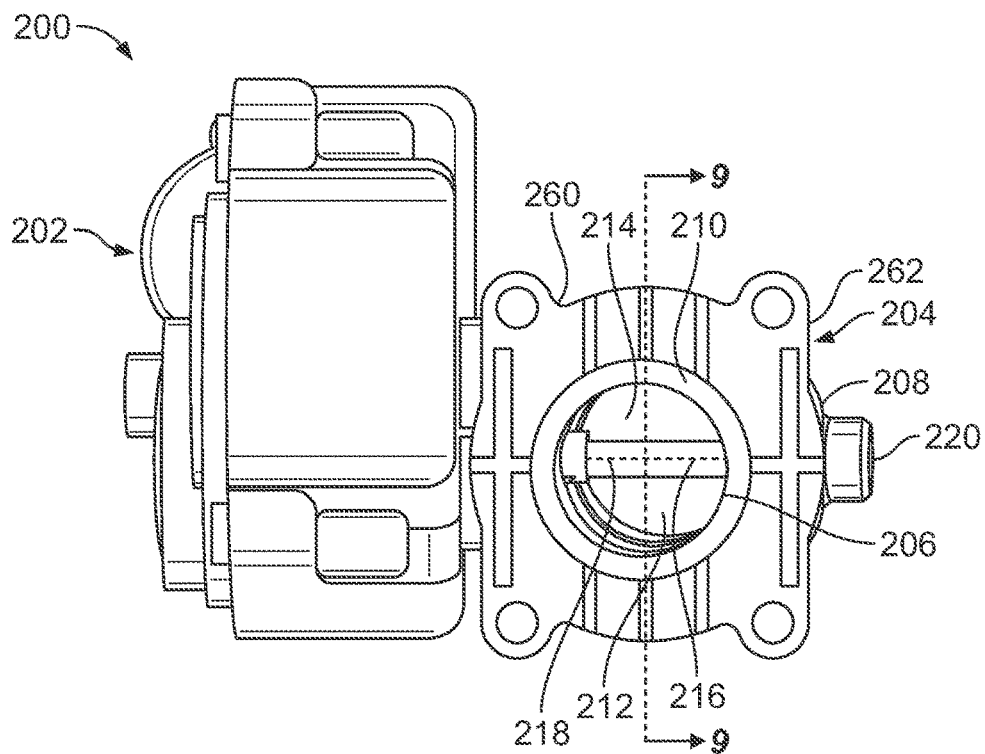
FIG. 8 illustrates an end view of a coolant regulator assembly, according to an embodiment of the present disclosure.

FIG. 8 illustrates an end view of the coolant regulator assembly 200. As noted, the housing 208 may be disposed within the fluid conduit 206. For example, the housing 208 may be an integral part of the fluid conduit 206, or a separate and distinct component secured to the fluid conduit 206. The fluid conduit 206 may include a generally cylindrical tube 210 that defines a central passage 212. A metering valve is rotatably secured within the housing 208 within a fluid path 214 that is in fluid communication (for example, fluidly coupled to) the fluid conduit 206. The metering valve (hidden from view in FIG. 8, as it is shown in an open position) operatively connects to the actuator within the main body 202 through an axle 216 having a central longitudinal axis 218 that is generally perpendicular to a direction of fluid flow through the fluid path 214. A first end of the axle 216 connects to the actuator within the main body 202, while an opposite second end of the axle 216 is rotatably secured within a bearing 220 of the housing 208.

As shown in FIG. 8, the valve is in a fully open position. As such, fluid (for example, coolant) is able to freely pass through the fluid path 214.

Figure 9:
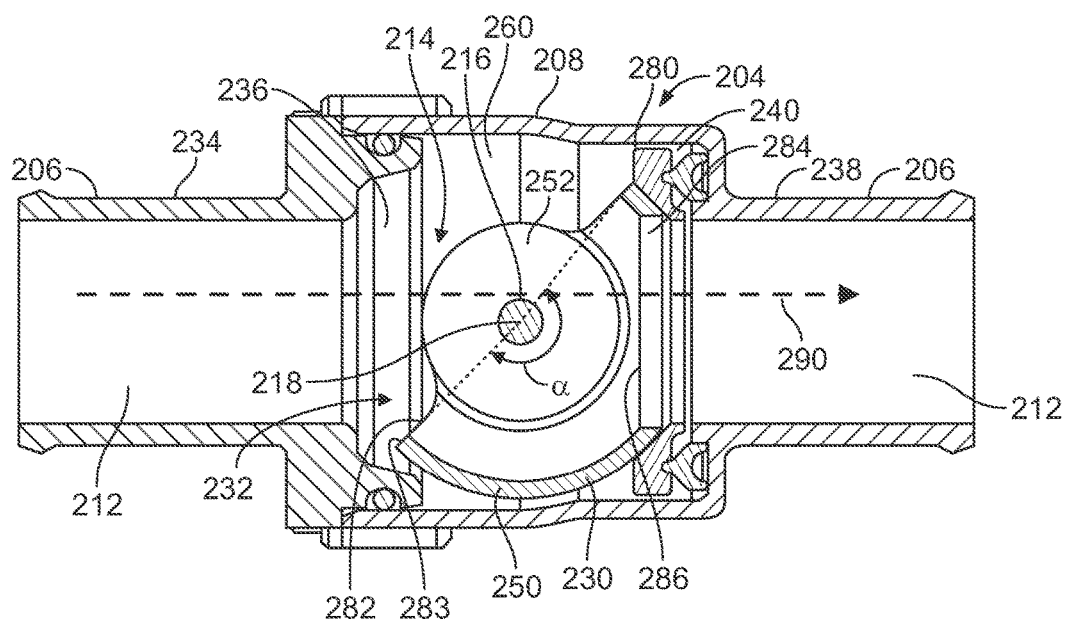
FIG. 9 illustrates a cross-sectional view of a fluid metering assembly with a metering valve in a fully open position through line 9-9 of FIG. 8, according to an embodiment of the present disclosure.

FIG. 9 illustrates a cross-sectional view of the fluid metering assembly 204 with a metering valve 230 in a fully open position through line 9-9 of FIG. 8, according to an embodiment of the present disclosure. The valve 230 may be formed of plastic, metal, and/or other materials. As shown, the housing 208 of the fluid metering assembly 204 defines an internal chamber 232 in which the valve 230 is rotatably secured. The valve 230 may be rotatably secured within a reciprocally-shaped volume of the internal chamber 232.

The fluid conduit 206 may include a fluid inlet portion 234 that connects to an inlet end 236 of the housing 208 and a fluid outlet portion 238 that connects to an outlet end 240 of the housing 208. Optionally, the housing 208 may be formed by expanded portions of the fluid conduit 206. For example, the fluid outlet portion 238 may provide an expanded portion that connects to the fluid inlet portion 234. The fluid path 214 is defined within the internal chamber 232 and is in fluid communication with the central passage 212 of the fluid conduit 206 that extends from the fluid inlet portion 234 to the fluid outlet portion 238. As such, the central passage 212 formed through the fluid conduit 206 may include the fluid path 214 within the housing 208.

The valve 230 may be a ball valve having a semispherical blocking wall 250 connected to one or more hubs 252 that connect to the axle 216. For example, a first hub 252 may be located proximate to an inboard wall 260 of the housing 208, while a second hub 252 may be located proximate to an outboard wall 262 (shown in FIG. 8) of the housing 208. The blocking wall 250 may extend over a radial angle α about the central longitudinal axis 218 of the axle 216. In at least one embodiment, the radial angle α exceeds 180 degrees. Optionally, the blocking wall 250 may extend over a radial angle that is equal to or less than 180 degrees.

The blocking wall 250 provides a fluid-blocking barrier that may extend from a leading end 280 to a trailing end 282. A fluid opening 284 is formed through the blocking wall 250 between the leading end 280 and the trailing end 282. The fluid opening 284 has a diameter 286 that may generally be the same diameter as the central passage 212. Thus, when the valve 230 is in the fully open position (as shown in FIG. 9), the fluid opening 284 is aligned within the central passage 212. As such, in the fully open position, the blocking wall 250 does not block any fluid from passing between the fluid inlet portion 234 and the fluid outlet portion 238. Accordingly, fluid 290 freely passes from the fluid inlet portion 234, through the valve 230, and into the fluid outlet portion 238.

The trailing end 282 may include an over-travel section that is sized and shaped to provide a pressure relief fluid path when the metering valve 230 is over-rotated past a closed position. For example, the pressure relief fluid path is formed when the metering valve 230 is in a pressure relief position. The pressure relief position is past the closed position and away from a direction towards the open position. That is, pressure relief position is in a direction that is opposite from a direction that would move the metering valve 230 from the closed position toward a fully open position. The trailing end 282 may include a recessed edge 283 or other such portion that is configured to allow fluid to pass thereby when the valve 230 is in an over-rotated position past the closed position. The valve 230 may be operatively connected to a return spring (not shown), which may operate to bias the valve 230 into a fully open position, as shown in FIG. 8.

In at least one embodiment, the metering valve 230 is over-rotated to an angular position that exceeds 93 degrees. The angular position of 93 degrees represents a hard stop closed position of a prior valve assembly. In at least one embodiment, the metering valve 230 may be over-rotated to an angular position of 120 degrees, which, it has been found, provides a fluid pressure relief path that efficiently relieves excessive pressure within an engine cooling system.

Figure 10:
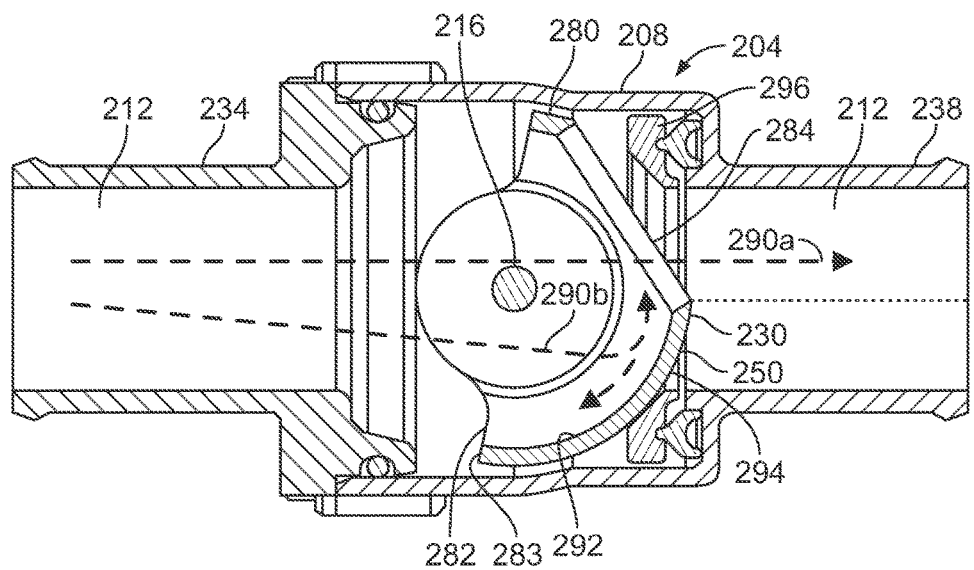
FIG. 10 illustrates a cross-sectional view of a fluid metering assembly with a metering valve in a partially open position through line 9-9 of FIG. 8, according to an embodiment of the present disclosure.

FIG. 10 illustrates a cross-sectional view of the fluid metering assembly 204 with the metering valve 230 in a partially open position through line 9-9 of FIG. 8, according to an embodiment of the present disclosure. As shown, the valve 230 may be half open, such that the fluid opening 284 is aligned with one half of the diameter of the fluid passage 212, while the blocking wall 250 is aligned with the other of the diameter of the fluid passage 212. The drive within the main body 202 (shown in FIGS. 3-8) rotates the metering valve 230 into the partially open position by rotating the axle 216.

In the partially open position, a first portion of fluid 290a passes from the fluid inlet portion 234 to the fluid outlet portion 238. However, a second portion of fluid 290b is blocked from passing into the fluid outlet portion 238 by an interior surface 292 of the blocking wall 250. As shown, an outer surface 294 of the blocking wall 250 may rotatably and sealingly contact a reciprocally-shaped surface of an internal valve bearing 296 within the housing 208. The metering valve 230 may be rotated to any angular position between and including a fully open position and a fully closed position. Further, the metering valve 230 may be rotated to a pressure relief position at an angular position past the fully closed position (and away from the fully open position). The pressure relief position provides a fluid pressure relief path that allows a portion of fluid to pass through the conduit 206 at a lower rate than when the metering valve 230 is in the fully open position. The reduced flow rate relieves the pressure buildup upstream from the metering valve 230.

Figure 11:
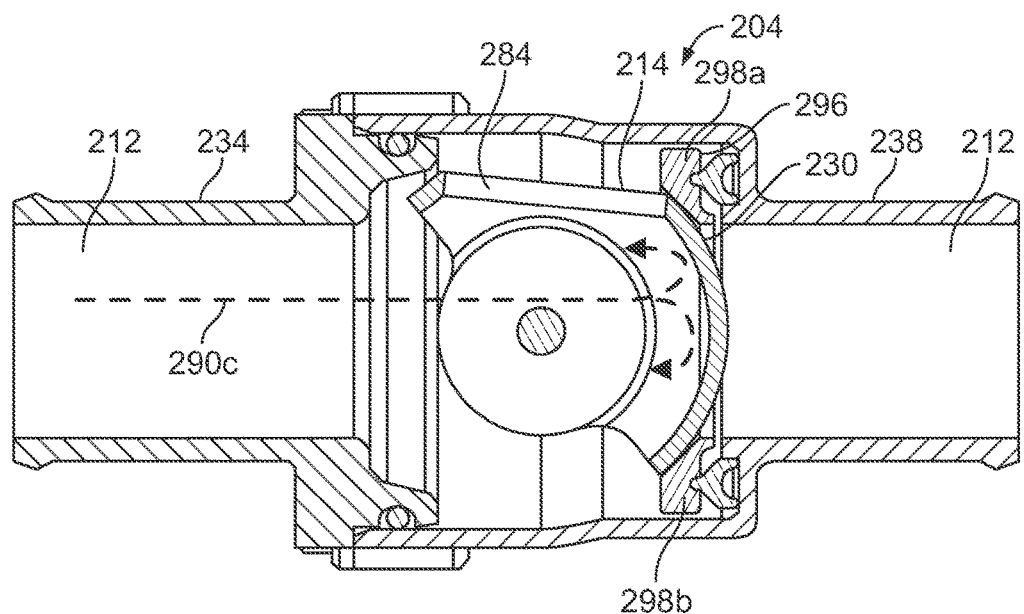
FIG. 11 illustrates a cross-sectional view of a fluid metering assembly with a metering valve in a fully closed position through line 9-9 of FIG. 8, according to an embodiment of the present disclosure.

FIG. 11 illustrates a cross-sectional view of the fluid metering assembly 204 with the metering valve 230 in a fully closed position through line 9-9 of FIG. 8, according to an embodiment of the present disclosure. As shown, in the fully closed position, the blocking wall 250 is positioned within the fluid path 214 such that the outer surface 294 of the blocking wall 250 contacts both ends 298a and 298b of the internal valve bearing 296 and block passage of fluid into the fluid outlet portion 238. Accordingly, the fluid opening 284 is rotated completely out of alignment with the fluid passage 212, thereby preventing any fluid 290c from passing from the fluid inlet portion 234 to the fluid outlet portion 238.

Figure 12:
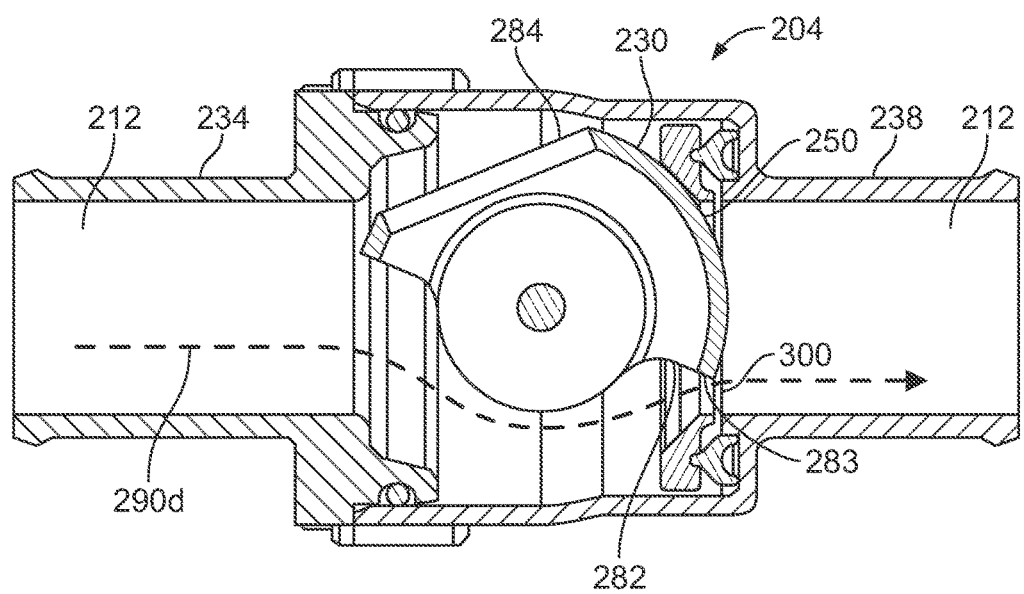
FIG. 12 illustrates a cross-sectional view of a fluid metering assembly with a metering valve in a pressure relief position through line 9-9 of FIG. 8, according to an embodiment of the present disclosure.

FIG. 12 illustrates a cross-sectional view of the fluid metering assembly 204 with the metering valve 230 in a pressure relief position through line 9-9 of FIG. 8, according to an embodiment of the present disclosure. The trailing end 282 of the blocking wall 250 may include the recessed edge 283. The recessed edge 283 may be inwardly radially curved, canted, or otherwise directed. For example, the recessed edge 283 may be inwardly curved in a direction toward the opening 284 so as to provide a pressure relief path 300 between the trailing end 282 and the end 298b of the internal valve bearing 296 when the valve 230 is over-rotated past a closed position. For example, the valve 230 may be rotated between an open position, in which the fluid opening 284 formed through the blocking wall 250 is fully aligned with the fluid passage 212, and a closed position in which no portion of the fluid opening 284 is aligned with the fluid passage 212 (instead, closed portions of the blocking wall 250 are aligned with the fluid passage 212). In response to fluid pressure upstream (for example, toward the fluid inlet portion 234) from the valve 230 exceeding a particular predefined threshold, the valve 230 may be rotated past the closed position (and away from the open position) so that the pressure relief path 300 is formed. In this manner, the pressure relief path 300 allows a reduced amount of fluid 290d to pass through the pressure relief path 300, which, in turn, reduces fluid pressure upstream from the metering valve 230.

Figure 13:
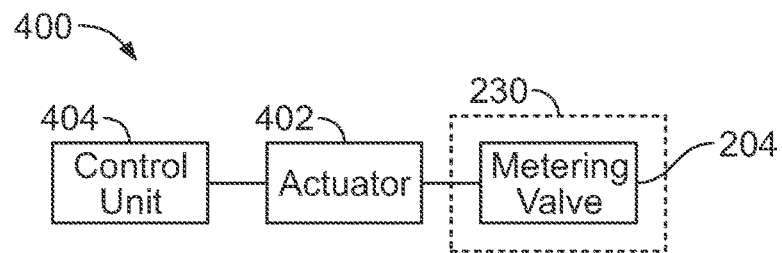
FIG. 13 illustrates a schematic block diagram of a system for controlling a metering valve, according to an embodiment of the present disclosure.

FIG. 13 illustrates a schematic block diagram of a system 400 for controlling the metering valve 230, according to an embodiment of the present disclosure. The system 400 is configured to control fluid flow through a fluid conduit, for example. The metering valve 230 may be rotatably secured within the fluid metering assembly 204, as described above. An actuator 402 may be operatively coupled to the metering valve 230. The actuator 402 may be or include a worm drive, piston(s), gear(s), axle(s), and/or the like. The actuator 402 may also be coupled to a control unit 404, which may be or include the engine control 114 (shown in FIG. 2). The control unit 404 may be housed within a main body of a coolant regulator assembly, such as the coolant regulator assembly 200 (shown in FIGS. 3-8).

In operation, the control unit 404 controls the actuator 402 to move the metering valve between open and closed positions, as described above. When the control unit 404 detects (such as through one or more pressure sensors disposed within a fluid conduit) that internal pressure exceeds a particular pressure threshold, the control unit 404 causes the actuator 402 to over-rotate the metering valve 230 past the closed position (in a direction away from the open position) so that a pressure relief path is formed, as described above. When the pressure recedes below the pressure threshold, the control unit 404 may direct the actuator 402 to cease over-rotation of the metering valve 230, at which point an internal biasing spring may cause the metering valve 230 to return to the closed position (or open position), for example.

As used herein, the term "controller," "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor capable of executing the functions described herein. Such are exemplary only, and are thus not intended to limit in any way the definition and/or meaning of such terms.

The control unit 404 may be configured to execute a set of instructions that are stored in one or more storage elements (such as one or more memories), in order to process data. For example, the control unit 404 may include one or more memories. The storage elements may also store data or other information as desired or needed. The storage element may be in the form of an information source or a physical memory element within a processing machine.

The set of instructions may include various commands that instruct the control unit 404 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 14:
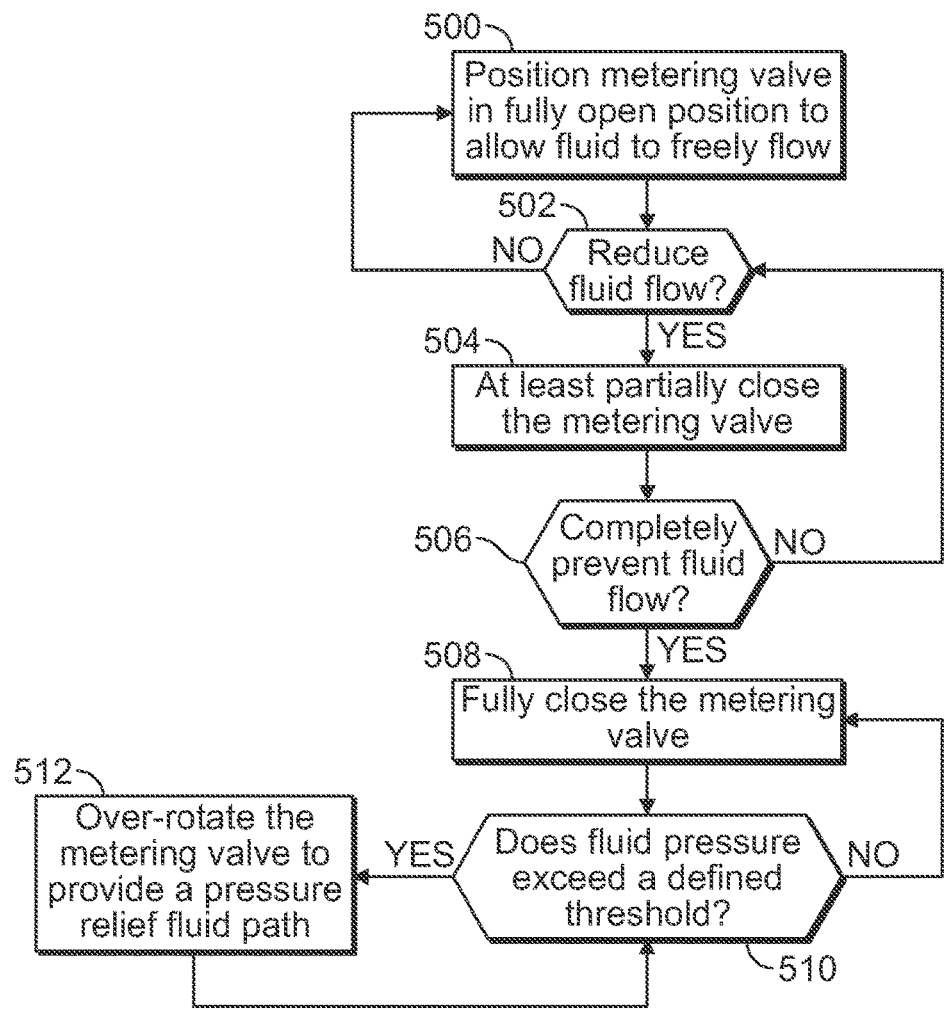
FIG. 14 illustrates a flow chart of a method for controlling a metering valve, according to an embodiment of the present disclosure.

FIG. 14 illustrates a flow chart of a method for controlling a metering valve, according to an embodiment of the present disclosure. At 500, a metering valve is positioned in a fully open position to allow fluid to freely flow through a fluid conduit. At 502, it is determined (such as by a control unit) whether fluid flow should be reduced. If not, the method returns to 500. If, however, fluid flow is to be reduced, the method proceeds from 502 to 504, in which the metering valve is at least partially closed. At 506, it is then determined if fluid flow through the fluid conduit is to be completely blocked or otherwise prevented (for example, preventing fluid from flowing from a fluid inlet portion to a fluid outlet portion of the fluid conduit). If not, the method returns to 502. If, however, fluid is to be completely prevented, the method proceeds from 506 to 508, in which the metering valve is rotated into a fully closed position.

Then, at 510, it is determined whether fluid pressure within the system (such as within the fluid conduit upstream from the metering valve) exceeds a defined threshold, which may be stored within a memory coupled to a control unit, for example. If not, the method returns to 508. If, however, the pressure does exceed the defined threshold, the method proceeds from 510 to 512, in which the metering valve is over-rotated into a pressure relief position to provide a pressure relief fluid path. The method then returns to 510.

Figure 15:
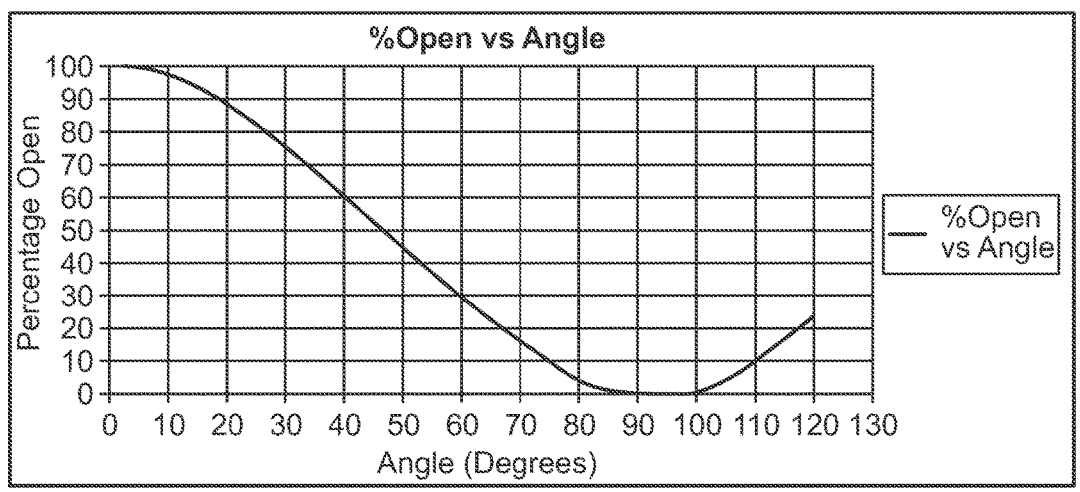
FIG. 15 illustrates a graph of operation of a metering valve within a coolant regulator assembly, according to an embodiment of the present disclosure.

FIG. 15 illustrates a graph of operation of a metering valve (such as the metering valve 230 described above) within a coolant regulator assembly, according to an embodiment of the present disclosure. As shown in FIG. 15, a hard stop (that is, the angle past which the metering valve is prevented from rotating past) for the metering valve may be at 120 degrees. As such, the metering valve may not be capable of being rotated further past the 120 degree so as to rotate the fluid opening formed through the metering valve into alignment with the fluid passage. Instead, in order to rotate the metering valve back to an open position, the metering valve is rotated in an opposite direction (for example, in a direction that is opposite from the rotation of the metering valve from the open position to the closed position). The soft stop region may be between 88-98 degrees. During normal operation, a return spring may be used to open the metering valve. During a pressure spike scenario (such as when fluid within a fluid conduit upstream from the metering valve exceeds a defined threshold), the metering valve may be rotated to a 120 degree position, thereby providing the pressure relief fluid path (such as the reduced fluid path), which allows fluid to pass therethrough and pressure to dissipate. It has been found that allowing the metering valve to rotate past the closed position to a radial angular position of 120 degrees provides a pressure relief fluid path that provides fast-acting, efficient fluid pressure relief. Alternatively, the degree of rotation and percentages open may be more or less than shown and described. For example, instead of being approximately 25% open at 120 degrees rotation, the metering valve may be more or less than 25% open at more or less than 120 degrees rotation.

Referring to FIGS. 2-15, embodiments of the present disclosure provide a coolant regulator assembly that provides fast-acting pressure relief. The coolant regulator assembly may include a metering valve (such as a ball valve) having an over-travel section that may be actuated to provide a pressure relief path during a cold start, thereby providing fast acting pressure relief. The metering valve may be rotated into a pressure relief position that is past a closed position (and away from a direction of an open position) to provide a fluid pressure relief path. The over-travel section may also be configured to allow the valve to be positioned at a known and/or predetermined position if a return spring fails.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fluid control system comprising:
   a fluid conduit defining a fluid passage;
   a fluid metering assembly in fluid communication with the fluid passage, wherein the fluid metering assembly includes a metering valve rotatably secured within an internal chamber;

an actuator coupled to the metering valve; and a control unit coupled to the actuator, wherein the control unit operates the actuator to rotate the metering valve between an open position in which fluid flows through the fluid passage and a closed position in which the fluid is prevented from flowing through the fluid passage, and wherein the control unit also operates the actuator to rotate the metering valve into a pressure relief position beyond the closed position that is configured to allow a reduced portion of the fluid to flow through the fluid passage, the pressure relief position being rotatably past the closed position and opposite from a direction towards the open position.

2. The fluid control system of claim 1, further comprising a coolant regulator assembly that comprises:

a main body that retains at least a portion of the actuator; and the fluid metering assembly, wherein the coolant regulator assembly is configured to be disposed within an internal combustion engine cooling system.

3. The fluid control system of claim 1, wherein the metering valve comprises a semispherical blocking wall, wherein a fluid opening is formed through a portion of the blocking wall, wherein the fluid opening aligns with the fluid passage in the open position.

4. The fluid control system of claim 3, wherein the blocking wall extends from a leading end to a trailing end.

5. The fluid control system of claim 4, wherein the trailing end comprises an over-travel section that is sized and shaped to provide a pressure relief fluid path when the metering valve is in the pressure relief position.

6. The fluid control system of claim 4, wherein the trailing end comprises a recessed portion that is configured to allow a portion of the fluid to pass thereby when the metering valve is in the pressure relief position.

7. The fluid control system of claim 1, wherein the open position is at 0 radial degrees, the closed position is in the range of 90 and 100 radial degrees, and the pressure relief position is between the closed position and up to and including 120 radial degrees.

8. A fluid metering assembly configured to be in fluid communication with a fluid passage of a fluid conduit, the fluid metering assembly comprising:

a metering valve rotatably secured within an internal chamber;

wherein the metering valve is rotatable between an open position in which fluid flows through the fluid passage and a closed position in which the fluid is prevented from flowing through the fluid passage, and wherein the metering valve is also rotatable into a pressure relief position beyond the closed position that is configured to allow a reduced portion of the fluid to flow through the fluid passage, the pressure relief position being rotatably past the closed position and opposite from a direction towards the open position.

9. The fluid metering assembly of claim 8, wherein the fluid metering assembly is coupled to a main body of a coolant regulator assembly, wherein the coolant regulator assembly is configured to be disposed within an internal combustion engine cooling system.

10. The fluid metering assembly of claim 8, wherein the metering valve comprises a semispherical blocking wall, wherein a fluid opening is formed through a portion of the blocking wall, wherein the fluid opening aligns with the fluid passage in the open position.

11. The fluid metering assembly of claim 10, wherein the blocking wall extends from a leading end to a trailing end.

12. The fluid metering assembly of claim 11, wherein the trailing end comprises an over-travel section that is sized and shaped to provide a pressure relief fluid path when the metering valve is in the pressure relief position.

13. The fluid metering assembly of claim 11, wherein the trailing end comprises a recessed portion that is configured to allow a portion of the fluid to pass thereby when the metering valve is in the pressure relief position.

14. The fluid metering assembly of claim 8, wherein the open position is at 0 radial degrees, the closed position is in the range of 90 and 100 radial degrees, and the pressure relief position is between the closed position and up to and including 120 radial degrees.

15. An engine cooling system comprising:

an internal combustion engine;

a cooling circuit including a radiator and a fluid conduit defining a fluid passage;

a coolant regulator assembly in fluid communication with the cooling circuit, the coolant regulator assembly comprising:

a fluid metering assembly in fluid communication with the fluid passage, wherein the fluid metering assembly includes a metering valve rotatably secured within an internal chamber; and a main body coupled to the fluid metering assembly, wherein the main body retains at least a portion of an actuator that is coupled to the fluid metering assembly, the engine cooling system further comprising a control unit coupled to the actuator, wherein the control unit operates the actuator to rotate the metering valve between an open position in which fluid flows through the fluid passage and a closed position in which the fluid is prevented from flowing through the fluid passage, and wherein the control unit also operates the actuator to rotate the metering valve into a pressure relief position beyond the closed position that is configured to allow a reduced portion of the fluid to flow through the fluid passage, the pressure relief position is rotatable past the closed position and opposite from a direction towards the open position.

16. The engine cooling system of claim 15, wherein the metering valve comprises a semispherical blocking wall, wherein a fluid opening is formed through a portion of the blocking wall, wherein the fluid opening aligns with the fluid passage in the open position.

17. The engine cooling system of claim 16, wherein the blocking wall extends from a leading end to a trailing end.

18. The engine cooling system of claim 17, wherein the trailing end comprises an over-travel section that is sized and shaped to provide a pressure relief fluid path when the metering valve is in the pressure relief position.

19. The engine cooling system of claim 17, wherein the trailing end comprises a recessed portion that is configured to allow a portion of the fluid to pass thereby when the metering valve is in the pressure relief position.

20. The engine cooling system of claim 15, wherein the open position is at 0 radial degrees, the closed position is in the range of 90 and 100 radial degrees, and the pressure relief position is between the closed position and up to and including 120 radial degrees.

* * * * *